Feb. 5, 1935.                J. W. JONES                1,990,123
                             LOOM TEMPLE
                          Filed Feb. 26, 1934

WITNESS.
CLINTON S. COBURN.

INVENTOR.
JOHN W. JONES.
BY
Claude F. Snider
ATTORNEY.

Patented Feb. 5, 1935

1,990,123

UNITED STATES PATENT OFFICE 1,990,123

LOOM TEMPLE

John W. Jones, Greenville, S. C., assignor to Draper Corporation, Hopedale, Mass., a corporation of Maine Application February 26, 1934, Serial No. 712,957

2 Claims. (Cl. 139—301)

The present invention pertains to loom temples and has more particular reference to positioning adjustments therefor.

The conventional temple includes a housing mounted on a stand on the breast beam of the loom. The housing is provided with a guideway for receiving and guiding the temple bar, which bar carries at its rearward end the laterally projecting temple head.

The temple head and bar are reciprocated each beat-up of the lay, and the continued reciprocation wears the bar and guideway, thus permitting the temple head to be pulled out of proper position.

I find that the temple bar and guideway usually wear in such manner as to permit the temple head to twist about the longitudinal axis of the bar and also to be pulled laterally.

It is the principal object of the invention to provide a novel and improved means for adjusting the temple head to compensate for wear.

A further object is to provide a single adjusting means which provides for both vertical and horizontal adjustment of the temple head.

In attainment of the objects mentioned, I have provided a two piece temple bar the pieces of which are provided respectively with complementary serrated flanges. The flanges are secured together by bolts which pass through slots in one of the flanges to permit angular adjustment of the temple head. The angular adjustment serves to raise the extreme inner end of the temple head and restore it to the level of the cloth.

In the specific embodiment herein disclosed the flanges are formed at an angle to the axis of the temple bar whereby angular adjustment of the temple head serves also to move the inner end of the head rearwardly to bring the head into parallelism with the fell of the cloth. By this means, a single adjustment is made to correct both vertical and horizontal misalignment of the temple head.

The preferred embodiment of my invention is illustrated on the accompanying drawing, of which:

Figure 1:
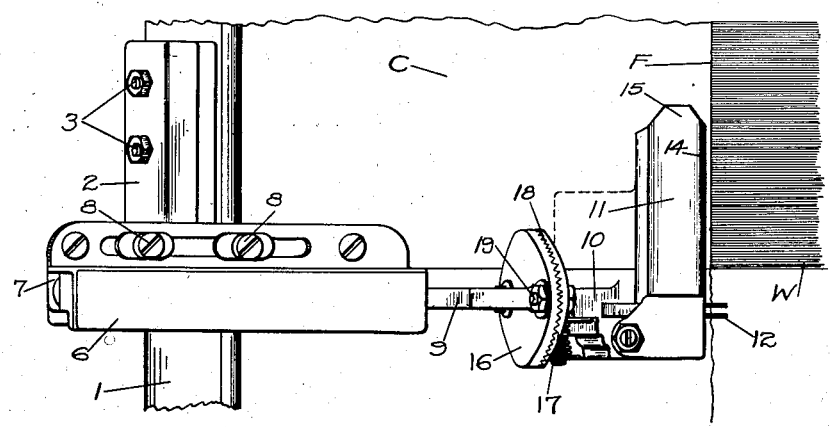
Fig. 1 is a plan view of the right hand temple in position on the loom.
Figure 2:
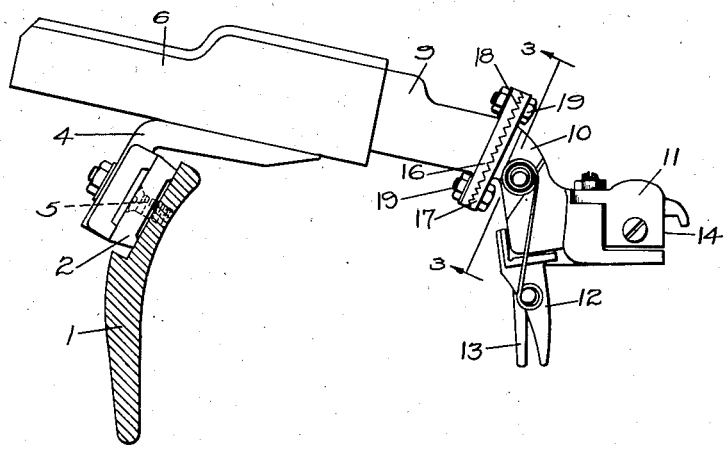
Fig. 2 is a side view of the temple, the breast beam appearing in section.

The loom to which my improved temple has been applied is not illustrated, except for a section of the breast beam 1. The breast beam extends across the front of the loom, and the warp threads W are woven into cloth C which feeds forwardly toward the breast beam in the usual manner. The fell line of the cloth is illustrated at F.

A slide member 2 is secured to the breast beam as by bolts 3, 3 and a temple stand 4 is bolted to the slide as by means of a bolt 5. A housing 6, provided with a guideway 7, is secured to the stand as by means of screws 8, 8. The slide, stand and housing shown are of conventional design and may be modified as desired.

A temple bar 9 is guided within the guideway and is urged rearwardly by the conventional spring (not shown) within the housing. The temple bar is formed in two pieces, the rear piece 10 of which carries the conventional laterally extending temple head 11. The head 11 may be provided with a thread cutting device 12 and is also provided with a depending heel 13 through which it is reciprocated. Proper operation of the temple requires that the rear face 14 of the head be substantially parallel with the fell F and that the head be in the proper vertical relation to the plane of the woven cloth.

Repeated reciprocation of the temple wears the bar 9 and guideway 7 in such manner as to permit the inner end 15 of the head 11 to drop down below its proper level and also to swing forwardly out of parallelism with the fell. It is to the provision of adjusting means for restoring the temple head to proper position that my invention pertains.

In order that the temple head may be adjusted to proper position I make the temple bar in two pieces as aforesaid and provide the desired adjustment in the connecting means for the two pieces. Such connecting means preferably comprises a pair of complementary serrated flanges 16, 17 formed, respectively, on the sections of the temple bar. The flanges may be of any configuration, they being shown as circular, and the serrations 18 preferably extend radially of the flanges.

Figure 3:
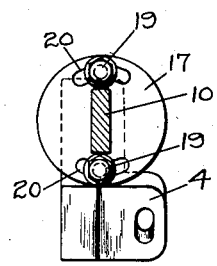
Fig. 3 is a section taken on line 3—3 of Fig. 2.

The flange 16 is apertured to receive fastening bolts 19, 19 and the flange 17 is slotted at 20, 20 to receive the same bolts, the slots being arcuate to permit rotative adjustment of the flange 17 and temple head. It will be noted that the flanges are not positioned normal to the axis of the bar 9 but at an acute angle thereto. In other words, the connection between the two pieces of the bar permits rotative adjustment of the temple head about an axis which is in the vertical plane of the forward piece of the bar but at an acute angle thereto. Consequently, rotation of the temple head counterclockwise, Fig. 3, will move the inner end 15 thereof upwardly and rearwardly. By judiciously selecting the proper angle for the flanges this one adjustment serves to compensate for wear of the temple bar and guideway as above mentioned.

Having fully disclosed the preferred embodiment of my invention, I claim:

1. In a loom temple, a housing having a guideway therein, a temple bar mounted in said guideway for reciprocation longitudinally thereof, said bar being formed of two separate pieces, a laterally extending temple head carried by the rear piece of said bar, and an adjustable connection for the pieces of said bar, said connection providing rotative adjustment of the said head about an axis which is in the vertical plane of the forward piece of said bar but at an acute angle thereto.

2. In a loom temple, a housing having a guideway therein, a temple bar mounted in said guideway for reciprocation longitudinally thereof, said bar being formed of two separate pieces, a laterally extending temple head carried by the rear piece of said bar, complementary serrated flanges on said pieces, and means for adjustably securing said flanges together, said flanges being positioned at an acute angle to the longitudinal axis of the forward piece of said bar.

JOHN W. JONES.